Aug. 31, 1943. R. T. COOK ET AL 2,328,423
OPHTHALMIC MOUNTING
Original Filed June 29, 1938
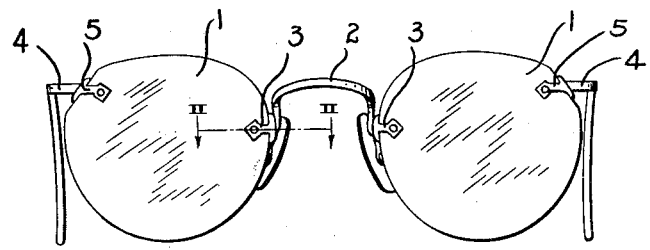
Fig. I
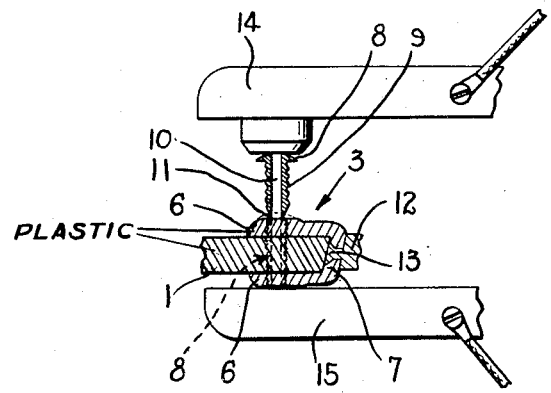
Fig. II
INVENTOR.
ROLAND T. COOK
WILFRID A. BONIN
BY
ATTORNEY.

Patented Aug. 31, 1943

2,328,423

UNITED STATES PATENT OFFICE 2,328,423

OPHTHALMIC MOUNTING

Roland T. Cook, Irvington, N. J., and Wilfrid A. Bonin, Southbridge, Mass., assignors to American Optical Company, Southbridge, Mass., a voluntary association of Massachusetts Original application June 29, 1938, Serial No. 216,526. Divided and this application July 5, 1940, Serial No. 344,034

3 Claims. (Cl. 88—47)

This invention relates to improvements in ophthalmic mountings and has particular reference to improved means and methods of connecting the lenses to the lens holding means of such mountings.

This application is a division of application Serial Number 216,526, filed June 29, 1938 (Patent No. 2,298,784, issued October 13, 1942).

One of the principal objects of the invention is to provide improved means and methods of connecting the lenses of an ophthalmic mounting to their lens holding means in such a manner as to avoid the preforming of connection openings in the lenses or lens holding means.

Another object is to provide novel means and method of connecting lens holding means to lenses, when both are formed of material having the characteristics of an artificial resin, such as methyl methacrylate, etc.

Another object is to provide a novel method of securing lenses and lens holding means of the above character, whereby the material of the lens and the lens holding means aids in retaining them in desired rigid position.

Another object is to provide connection means which may be heated and pressed through the lens holding means when in position on the lens, and through the lens into another portion of the lens holding means, and, to cause the material of the lens and lens holding means to soften under the action of the heat and flow about the rivet and when cool to harden and secure the rivet in position therein.

Another object is to provide novel means and methods of connecting lens holding means to lenses formed of material having the characteristics of an artificial resin, such as methyl methacrylate, etc.

Another object is to provide connection means which may be heated and pressed through the lens holding means, when in position on the lens, and into the body of the lens to cause the material to soften under the action of the heat and flow about the rivet, and, when cool, to harden and secure the rivet in position therein.

Another object is to provide novel connection means for connecting the lens holding means to the lenses, which may be pressed into a portion of the lens holding means, through the body of the lens and into mechanically interlocked relation with another portion of said lens holding means.

Another object is to provide novel means and methods of connecting lenses of an ophthalmic mounting to their lens holding means whereby a portion of the body of a lens may be displaced into connected relation with a portion of the lens holding means and simultaneously have a connection member embedded therein.

Other objects and advantages of the invention will become apparent from the following description taken in connection with the accompanying drawing, and it will be apparent that many changes may be made in the arrangement of parts, details of construction and method shown and described without departing from the spirit of the invention as expressed in the accompanying claims. We, therefore, do not wish to be limited to the exact details of construction, arrangement of parts and method shown and described, as the preferred form only has been given by way of illustration.

Referring to the drawing:

Fig. I is a front elevation of an ophthalmic mounting embodying the invention; and Fig. II is a view taken on line II—II of Fig. I showing in addition the pin member in position ready to be forced into the strap and the heating elements in initial assembly position.

Ophthalmic lenses, in the past, have usually been formed of glass having a fragile nature. It has been usual in connecting such lenses to the lens holding means or lens straps of an ophthalmic mounting, to form connection openings in the lenses in aligned relation with suitable connection openings formed in the lens holding means or straps. Such openings were to receive separate connecting means by which the lenses were secured to said holding means or straps.

Much difficulty has been encountered in properly fitting and securing such prior art lens straps to the lenses, particularly in instances where it was desired to have the lens straps connected in relatively rigid relation with the lenses. This difficulty was due primarily to the inability of the connection openings to be formed in proper relation with respect to the edges of the lenses. If said connection openings were formed too close to the edges of the lenses, the lens holding means or lens straps would fit loosely thereon. If, on the other hand, the openings were spaced inwardly of the edges a greater amount than necessary, the openings in the strap and lens could not be aligned and, therefore, could not be connected. Great care, therefore, had to be taken to be sure the openings were in proper alignment when the parts were in desired fitted relation with each other.

Such connection openings were formed in the lenses by a separate drilling operation and, because of the fact that most prior art lenses were formed of glass having an exceptionally fragile nature, such drillings were exceptionally difficult and painstaking operations.

Disalignment of the connection openings also caused a strain to be set up in the lenses when the connection means were inserted in the connection openings, and such strain, in many instances in the past, caused the lenses to break and become impractical for use.

In the past, also, lens straps have been made with openings in their ears to permit the insertion of a screw or other holding member. An object of the present invention is to provide a lens strap which is not perforated previous to assembly and which may be assembled to a lens by pressing a holding member therethrough.

This obviates the prior art operations of drilling holes, countersinking and tapping as well as the necessity for lining up the opposed strap ear holes during their forming and after assembly.

This invention provides a lens strap and lens which do not have to be drilled or otherwise processed to contain the connection member prior to assembly and which permit the insertion of a pin member into the body of both during assembly.

It, therefore, is one of the primary objects of this invention to overcome the above difficulties by providing lenses and lens holding means or lens straps formed of resinous material having the characteristics of methyl methacrylate, and method of assembling and connecting such lenses and lens straps whereby lens holding means may be connected in positive rigid relation with the lenses without the necessity of first forming and aligning connection openings, and has particular reference to the novel method of connecting the lens holding means to the lenses whereby the material of the lens and lens holding means aids in securing the connecting means used in securing the lens holding means or lens straps to the lenses.

Referring more particularly to the drawing wherein like reference characters refer to like parts throughout the several views:

The ophthalmic mounting embodying the invention, as shown in Fig. I, comprises a pair of lenses 1 having a bridge member 2 connected thereto by suitable lens straps or lens holding means 3. Suitable temple supports 4 are connected to the lenses by lens straps or lens holding means 5, having characteristics similar to lens straps or lens holding means 3.

The lens straps 3 or 5, as the case may be, as shown in Fig. II, may be provided with one or two ears 6, shaped to overlie the side surfaces of the lens 1 and have a portion 7 shaped to overlie the edge of the lens. The lens strap or holding means 3 is positioned in desired relation with the lens and a heated rivet or the like 8, having suitable interlocking means 9 thereon, is forced through one of the strap ears and into and through the lens 1 and into the other strap ear. The strap may have only one ear, and the said lens connecting means may extend in this instance only through the ear and into the body of the lens. This is accomplished by controlling the length of the connecting means.

It is to be understod that the lens 1 and lens strap 3 may be formed of the same or different colors.

The connecting means are shown in holding position by the dotted lines.

The rivet 8 is provided with a hollow bore 10 and a knife like edge 11, so that the said rivet 8 has a combined punch and riveting function. It is apparent that the hollow bore and knife-like edge 11, when pressed into the material under the action of the heat, will cut a plug-like piece out of the immediately engaged ear of the strap 3 and lens 1 during its inward movement through said strap and lens; and simultaneously force the irregular protrusions 9 of the sides into locked relation with said strap ear and lens. Should the material of the lens strap and lens, forced inwardly of the hollow bore 10 of the connecting means 8, protrude from said connecting means, after the parts have been united, said material may be extracted from the connecting means or cut off flush with the head of the connecting means.

It is to be understood that the lens straps 3 may be mounted to the bridge, temple supports, or other parts of the ophthalmic mounting, as indicated at 12, which are to be assembled with the lenses, as by a headed pin connection 13, or by any other suitable means.

The composition of the lenses and lens holding means described herein is of a resinous nature having the characteristics of methyl methacrylate. There are several of these compositions in commercial use today. These are put out under various names such as Plexiglas, Lucite, Metastyrol, etc. There are also certain commercial phenolic condensation products that may be used, such as Bakelite, Catalin, Marblette and Fiberlon. Materials having the characteristics of methyl methacrylate are clear and transparent and are exceptionally resistant to acids, corrosion, weathering, etc. Such materials are exceptionally light in weight and have a relatively tough, non-frangible nature. Another feature of great importance is that said materials are relatively non-inflammable. It is, therefore, possible to use heated type connecting means such as described above for uniting the lens straps or lens holding means with such lenses without the danger of igniting the lenses.

It is to be borne in mind that the temperature of the heat used is only such as to permit the connecting means to be easily forced into the composition of the lens and lens holding means and is only sufficient to cause the composition of the lens and lens holding means in immediate engagement with the connecting means to materially soften and flow. This is important when it is desired to form a rigid and positive connection between the lens strap and the lens.

The process of connecting the lens holding means or lens straps with the lenses is substantially as follows:

The lens is first shaped to the desired contour shape. The lens strap or lens holding means is then positioned and held in desired fitted relation with said lens. The lens connecting means, which is to be used in connecting the strap to the lens, is held in position by means of the clamp jaws 14 and 15 of a pair of pliers or other suitable means. The jaws are then heated to a temperature which, when under pressure exerted on said jaws, will enable the connecting means to move fairly freely inwardly of the adjacent strap ear, body of the lens and in the case when two ears are used, extend within the other strap ear. The parts are held in this relation and allowed to cool and set. Upon hardening the material of the lens strap secures the connecting means and rigidly holds the parts in assembled relation with each other.

It is to be understood that the heat is only sufficient to cause the material of the lens and strap to flow sufficiently to permit the insertion of the connecting means and to cause the material to flow to the outer or inner contour shape of the connecting means so that, when allowed to cool, the connecting means and the material of the lens adjacent the connecting means will be relatively intimately fitted with each other.

The connecting means are preferably formed of a metal or material which can be heated quite rapidly so that when the heated jaws are moved into engagement with said lens strap and connecting means the said connecting means are heated more quickly. It is also to be understood that the heating device may be so arranged to direct the major portion of its heating to said connecting means.

The heating unit may be of the electrical type commonly known in the art, in which instance the rivets or connecting means could be formed of a metal such as Inconel, Nichrome, Chromel, or the like, having a high resistance and the lens straps or lens holding means formed of a resinous type material or plastic material.

This step of heating is carefully controlled so that it will not in any way injure or spoil the connection. If an electrical type heating unit is used, wherein the heat is generated very quickly, the said device is snapped on and quickly snapped off.

It will readily be seen that the movement of the heating jaw 14 towards the strap 3, when stopped, indicates that the pin 8 is in assembled, positional relation with the lens.

From the foregoing description it will be seen that simple and economical means and method has been provided for quickly and easily attaching the lens holding means and lenses of composition type together, particularly novel means and method whereby the connecting means may be forced into rigid connected relation with the lens holding means and lens without first forming openings in either.

Having described our invention, we claim:

1. The method of forming an ophthalmic mounting comprising forming a lens of plastic resinous material having opposed optical surfaces and the contour desired, forming lens holding means with a portion shaped to overlie the edge of the lens and with a portion of plastic resinous material shaped to overlie a side surface of a lens, said portion overlying the side surface of the lens and said lens being normally imperforate, softening said portion overlying the side surface of the lens and said lens in the locality in which they are to be connected and forcing an anchor member through said softened portion overlying the side surface of the lens and into the body of the lens and permitting said lens and the portion of the lens holding means overlying the side surface of the lens to cool and harden adjacent the anchor member to secure the parts together.

2. The method of forming an ophthalmic mounting comprising forming a lens of plastic resinous material having opposed optical surfaces and the contour desired, forming lens holding means with a portion shaped to overlie the edge of the lens and with spaced portions of plastic resinous material shaped to overlie the opposed side surfaces of a lens, said portions overlying the side surfaces of the lens and said lens being normally imperforate, softening said portions overlying the side surfaces of the lens and said lens in the locality in which they are to be connected and forcing an anchor member through one of said softened portions overlying the side surface of the lens, through the body of the lens and into the other of said side surface overlying portions and permitting said lens and the portions of the lens holding means overlying the side surfaces of the lens to cool and harden adjacent the anchor member to secure the parts together.

3. In combination, an ophthalmic lens formed of transparent moldable plastic material, an ophthalmic mounting, said mounting having a strap formed of moldable plastic material comprising a portion shaped to overlie the edge of the lens and spaced ears overlying the opposed side surfaces of the lens and anchor means comprising a body portion having protrusion means on the side surface thereof and an enlarged head adjacent one end thereof, said body portion of the anchor means extending through one of the strap ears, through the lens and into the other of said strap ears with the enlarged head thereof engaging one of said ears, said strap ears and lens being initially imperforate and the material thereof being deformed and flowed into intimate contact with said body portion of the anchor means.

ROLAND T. COOK.
WILFRID A. BONIN.